F. S. WASHBURN.
PROCESS OF MAKING AMMONIUM NITRATE AND OTHER PRODUCTS.
APPLICATION FILED MAY 6, 1916.
1,217,247.
Patented Feb. 27, 1917.
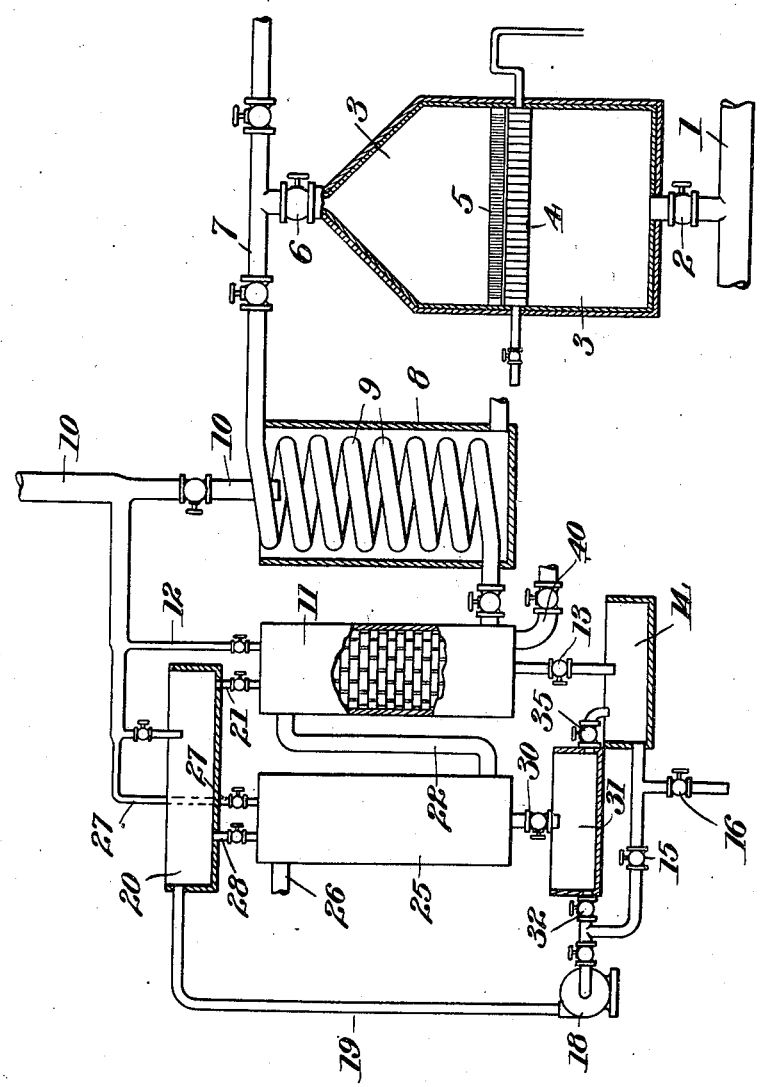
Inventor
Frank S. Washburn, by
Attorney

UNITED STATES PATENT OFFICE.

FRANK S. WASHBURN, OF NEW YORK, N. Y.

PROCESS OF MAKING AMMONIUM NITRATE AND OTHER PRODUCTS.

1,217,247.  Specification of Letters Patent.  Patented Feb. 27, 1917.

Original application filed February 7, 1916, Serial No. 76,647. Divided and this application filed May 6, 1916. Serial No. 95,897.

*To all whom it may concern:*

Be it known that I, FRANK S. WASHBURN, a chemical engineer, and a citizen of the United States, residing at New York, in the county of New York and State of New York, have invented certain new and useful Improvements in Processes of Making Ammonium Nitrate and other Products; and I do hereby declare the following to be a full, clear, and exact description of the invention, such as will enable others skilled in the art to which it appertains to make and use the same.

This invention relates to a process of treating ammonia in such a manner as to produce a highly concentrated nitric acid simultaneously with other useful ammonia salts, and has for its object to provide a means and a method that will obviate the inherent difficulties in the processes heretofore proposed, while enabling one to operate more efficiently and economically.

With these and other objects in view the invention consists in the novel combinations of steps constituting the process as will be more fully hereinafter disclosed and particularly pointed out in the claims.

This application is a division of my prior application Serial Number 76647, filed February 7, 1916 and entitled Process of and apparatus for making nitric acid and other products.

In the well known processes of oxidizing ammonia it has long been recognized that when subjecting the ammonia and oxygen containing mixture to the influence of a suitable catalyzer, a simultaneous oxidation of the ammonia to nitrose gases and a decomposition of these nitrose gases to nitrogen gas takes place. It is, therefore, well recognized that one must so control these simultaneous reactions that the velocity of the oxidation reaction is very materially greater than the velocity of the decomposition reaction, for otherwise, one will decompose too much of the nitrose gases to enable a commercially practicable process to result.

In one of the prior processes the relative velocities of these two simultaneously occurring reactions are controlled by so adjusting the size of the catalyzing mass and the velocity of the gases passing through it, that all the ammonia is either oxidized or decomposed, and none gets past in the form of free ammonia. But the control of the velocity of such gases, particularly ammonia, is very complicated and difficult, for it is influenced to a considerable extent by the relative quantities of ammonia and oxygen contained in the mixture, as well as by the actual rate at which the gas passes the catalyzer. In practice it is not only difficult to maintain the desired uniform mixture containing the right proportions of ammonia and oxygen but even with a carefully designed catalyzer, it is almost impossible to pass every portion of this mixture at exactly the right rate uniformly, over every portion of the catalyzer, so that no free ammonia escapes through without suffering a decomposition or an oxidation.

Accordingly, this said prior process, on the average, has been forced to operate somewhat below its maximum rate, in order to avoid obtaining free ammonia with the product.

Further when operating said prior process in practice, it is found that the decomposition by the catalyzer of the nitrose gases becomes quite serious and it is safe to assume that its efficiency of oxidation of the ammonia, is probably not over 75% to 85%.

On the other hand, according to the invention now to be disclosed it involves no serious inconvenience if the mixture containing ammonia and oxygen be passed at such a rate over or through the catalyzer that free ammonia appears in the products of the reaction. But one, of course, should avoid passing said mixture at such a rate as to produce a very large excess of ammonia, for in that case other difficulties will result as will be now explained.

That is to say, technical difficulties in designing and operating the oxidizing apparatus prohibit the employment of such a speed in the mixture passing the catalyzer as will produce a very large excess of free ammonia on the exit side of the said catalyzer; but it is, yet commercially possible to employ such a speed through the catalyzer as will permit the production of large quantities of nitrose gases, and some free ammonia, so that said nitrose gases may be converted into nitric acid and said free ammonia may combine with said acid to form ammonium nitrate, as will more fully appear below. In other words, should too much free ammonia be thus converted into ammonium nitrate it will tend to condense in the colder portions of the apparatus, and clog them up so it is only by operating very skilfully in such cases that one can practically carry out the direct production of ammonium nitrate in this way.

It is, however, very convenient to permit say 5% to 15% of the ammonia fed to the catalyzer to pass through undecomposed, and it is with such relative smaller quantities of free ammonia, that I prefer to operate.

In carrying out this invention I prefer to pass this free ammonia along with the nitrose gases through a suitable cooler and into an oxidation tower, when with a properly designed apparatus, a very large proportion of that passing the catalyzer can be kept from decomposition, and passed into the oxidation and absorption towers as free ammonia, where it combines with the nitric and nitrous acids formed and finally appears as ammonium nitrate dissolved with dilute nitric acid.

This dilute nitric acid is next concentrated by a suitable means. But a concentration by means of any of the well known sulfuric acid processes, converts this ammonium nitrate into ammonium sulfate and nitric acid, which acid can be recovered as such; and when the sulfate has accumulated to a suitable concentration, it of itself, will precipitate out, and is recovered from the sulfuric acid in the usual and well known manner. As an alternative method I may so operate that I permit free ammonia to pass the catalyzer and form ammonium nitrate dissolved in nitric acid as above described and I then saturate the excess of nitric acid with ammonia from an outside source so as to produce from my oxidation apparatus ammonium nitrate as its sole product. This solution can be readily evaporated and crystallized, thus producing a dry ammonium nitrate which can be marketed as such or employed in many industries.

In case I do not desire to market the ammonium nitrate produced as above, I can treat the dry ammonium nitrate with a suitable concentration of sulfuric acid and convert all of it into ammonium sulfate and highly concentrated nitric acid, which two products also find a ready market.

I have further found, when the velocity of my gas current, containing ammonia and oxygen, is increased, through, or over the catalyzer, to such a point that ammonia passes the catalyzer undecomposed, I am really obtaining a maximum velocity of the ammonia oxidation reaction, and a minimum velocity of the nitrose gas decomposition, referred to above, so in such case, I obtain a very much higher efficiency of oxidation of the ammonia with considerably less decomposition of either the ammonia or of the nitrose gases, than is the case where I so limit the velocity of these gases through or over the catalyzer to such an extent that no ammonia appears in the products of the oxidation, as such.

It therefore follows that by observing the quantity of free ammonia that passes the catalyzer, I am enabled to judge the real efficiency of the chemical reaction that is going on. In fact, it is a comparatively simple matter to oxidize ammonia by this system at an efficiency far above 90% if proper account is taken of the undecomposed ammonia passing the catalyzer.

In carrying out the process, I prefer to use a mixture of predetermined proportions of ammonia and oxygen, of ammonia air and oxygen or of ammonia and air, and to precool the same all in a manner similar to that disclosed in the copending application of Walter S. Landis, filed February 15, 1915, Serial No. 9595, and entitled Method of and apparatus for oxidizing ammonia.

In order that the invention may be the more clearly understood, reference is had to the accompanying drawing forming a part of this specification, in which the figure is a diagrammatic partially sectional, partially elevational view of an apparatus suitable for carrying out the process.

Referring to the said drawing, 1 indicates any suitable conduit for supplying the ammonia mixture to be oxidized, 2 a valved connection leading from said conduit to the oxidizing chamber 3. Located in the chamber 3 is any suitable form of cooler 4 adapted to cool the gaseous mixture before reaching the catalyzer, 5, or to screen the oncoming stream of ammonia from the heat radiated from said catalyzer. The catalyzer may be of any suitable material, but I prefer iridium free platinum of a uniform cross section in order that it may be uniformly heated by an electric current.

After the gaseous mixture passes the catalyzer 5, it will be found to contain the oxids of nitrogen mixed with ammonia, water vapor and free nitrogen, if air was originally employed, and this mixture passes through the valved connections 6 to the conduit 7, thence preferably through a cooler 8, having a coil 9 and a supply 10 for a cooling medium.

From the cooler 8, the said mixture is conveniently passed through a suitable absorption tower 11 which may be supplied with water through the pipe 12, when the nitrose gases and free ammonia are readily taken up. A reaction now occurs by which there is formed a solution of nitric acid and ammonium nitrate which may be drawn off through the valved pipe 13 into the tank 14, and from this tank the said solution may be readily withdrawn through the valved connection 15 and valved connection 16.

If the solution obtained in tank 14 is not sufficiently concentrated to warrant the separation of its nitrogen containing constituents, it may be repeatedly circulated through the tower 11 by means of the pump 18, pipe 19, tank 20 and valved connection 21, the unabsorbed gases in all cases escaping from tower 11, through the pipe 22. If the tower 11 is so designed as to absorb all the ammonia and nitrose gases delivered to it, then the other gases contained in the mixture may be led to waste through said pipe 22. But in those cases, where it is less expensive to run the said nitrogen containing gases through a plurality of towers, in order to absorb all the combined nitrogen the said pipe 22 is led to one or more additional towers such as 25, from which the waste gases escape through the pipe 26.

The tower 25 may be conveniently supplied with water through the pipe 27, and connected with the tank 20, through the pipe 28. The solution of nitric acid and ammonium nitrate formed in said tower 25 may be conveniently delivered through the connection 30 to the tank 31, from which it may be drawn off by means of the valved connections 32, 15 and 16 when desired, or when said solution is found to be too weak for drawing off it may be repeatedly circulated back through said tower 25, by means of the pump 18, pipe 19, tank 20 and connection 28. A valved pipe 35 permits the contents of the tank 31 to be emptied at will into the tank 14.

When it is desired to convert all the nitric acid into ammonium nitrate free ammonia may be led to the tower 11 through the valved pipe 40.

It is obvious that those skilled in the art may vary the details of both the process and apparatus without departing from the spirit of the invention, and therefore, I do not wish to be limited to the above disclosure except as may be required by the claims.

What I claim is:—

1. The process of producing ammonium nitrate, which consists in subjecting a mixture of ammonia and oxygen containing gases to the action of a catalyzer and at such a rate as to cause nitrous gases and free ammonia to appear in the products of the reaction; producing a solution of nitric acid and ammonium nitrate from said products; and adding free ammonia to said solution to convert said nitric acid into ammonium nitrate, substantially as described.

2. The process of producing a concentrated nitric acid, which consists in subjecting a mixture of ammonia and oxygen containing gases to the action of a catalyzer and at such a rate as to cause nitrose gases and free ammonia to appear in the products of the reaction; producing a solution of nitric acid and ammonium nitrate from said products; adding free ammonia to said solution to convert said nitric acid into ammonium nitrate; suitably recovering said monium nitrate; and treating said nitrate to form a concentrated nitric acid, substantially as described.

3. The process of producing ammonium nitrate, which consists in subjecting a mixture of ammonia and oxygen containing gases to the action of a catalyzer and at such a rate as to cause nitrous gases and not exceeding 20% of free ammonia to appear in the products of the reaction; producing a solution of nitric acid and ammonium nitrate from said products; and adding free ammonia to said solution to convert said nitric acid into ammonium nitrate, substantially as described.

4. The process of producing a concentrated nitric acid and which consists in subjecting a mixture of ammonia and oxygen containing gases to the action of a catalyzer and at such a rate as to cause nitrose gases and not exceeding 20% of free ammonia to appear in the products of the reaction; producing a solution of nitric acid and ammonium nitrate from said products; adding free ammonia from an outside source to said solution to convert all of said nitric acid into ammonium nitrate; suitably recovering said nitrate; and treating said nitrate to form a concentrated nitric acid, substantially as described.

In testimony whereof I affix my signature in presence of two witnesses.

FRANK S. WASHBURN.

Witnesses:
  BRUNN DELANY,
  G. M. SCHURMAN.